United States Patent [19]

Raabe et al.

[11] 4,173,509
[45] Nov. 6, 1979

[54] APPARATUS FOR SPLICING TREAD STRIPS

[75] Inventors: Ralph C. Raabe, Letts; Roger G. Cleffman; Raymond G. Stratton, both of Muscatine, all of Iowa

[73] Assignee: Bandag Incorporated, Muscatine, Iowa

[21] Appl. No.: 870,584

[22] Filed: Jan. 18, 1978

Related U.S. Application Data

[62] Division of Ser. No. 649,518, Jan. 15, 1976, Pat. No. 4,082,592.

[51] Int. Cl.$^2$ .............................................. B29C 27/06
[52] U.S. Cl. ................................... 156/507; 156/304; 156/499
[58] Field of Search .............. 156/157, 159, 304, 502, 156/228, 507, 499; 269/266, 265

[56] References Cited

U.S. PATENT DOCUMENTS

| | | | |
|---|---|---|---|
| 3,075,571 | 1/1963 | Wise | 156/502 |
| 3,130,100 | 4/1964 | Hasselquist | 156/157 |
| 3,400,030 | 9/1968 | Burger | 156/304 |
| 3,793,120 | 2/1974 | Spadano | 156/304 X |
| 3,935,056 | 1/1976 | Koyama et al. | 156/507 |
| 3,962,022 | 6/1976 | Bottasso et al. | 156/304 X |

Primary Examiner—Michael G. Wityshyn
Attorney, Agent, or Firm—Cushman, Darby & Cushman

[57] ABSTRACT

A machine for splicing or joining the ends of two precured rubber tread strips each having a pattern of ribs and grooves in one surface thereof. The machine includes first and second tread-clamping assemblies each of which grips the opposite surfaces of one of the tread strips between two elements and further includes power means for moving one of the assemblies toward the other in order to tightly abut the ends of the tread strips while heat is applied to effect vulcanization of a bonding material which previously has been inserted between the ends.

8 Claims, 3 Drawing Figures

APPARATUS FOR SPLICING TREAD STRIPS

This is a division of application Ser. No. 649,518 filed Jan. 15, 1976, now U.S. Pat. No. 4,082,592.

This invention relates to apparatus for splicing or joining together the ends of precured rubber tire tread strips.

BACKGROUND AND SUMMARY OF THE INVENTION

Precured tire tread strips are manufactured on a large scale for use in retreading tires. During the manufacturing process a rubber composition is molded into the form of a strip of tread of finite length, e.g. twelve feet, and having a desired rib and groove pattern in one surface, and the molded strip is vulcanized in the mold under high pressure and temperature to give a tough long-wearing tread strip. Subsequently the strip is cut into appropriate lengths each of which is used to retread a tire by wrapping the length around a prepared tire carcass and then bonding the two together.

It is often desirable to permanently join the end of one piece of precured tread strip to the end of another such piece. This may also arise from the production of pieces of relatively short length during the manufacturing operation as a result of cutting out flawed sections of longer pieces. Such short pieces are not usable as such for retreading operations but when joined together end-to-end the resulting integral piece is suitable for retreading purposes. Also it is sometimes desirable to join together the standard pieces to make a still longer piece for use on automatic tread machines.

Splicing or joining pieces of precured tread strips can be carried out with known equipment which applies clamping pressure in directions normal to the tread faces of two tread pieces arranged in end-to-end relationship. A rubber-base vulcanizable bonding material previously inserted between the two ends bonds the ends together under the influence of heat which is applied during the clamping operation.

The present invention contemplates a splicing or joining technique which positively presses the ends of the two tread pieces together under high pressure by applying forces to the end portions in the plane of the pieces, while at the same time applying the heat required for the bonding step. The apparatus in its broadest form includes two mold elements each of which has a ribbed surface complementary to the grooved surface of the respective tread strip, two clamping elements each cooperating with one of the mold elements to clamp a tread strip therebetween, power means for effecting relative movement between the clamped tread strips such that the ends of the strips are abutted and forced tightly together, and means for applying heat to the abutted ends.

DETAILED DESCRIPTION OF AN EXEMPLARY EMBODIMENT

The invention will be further understood from the following more detailed description of an exemplary embodiment, taken with the drawings in which.

Figure 1:
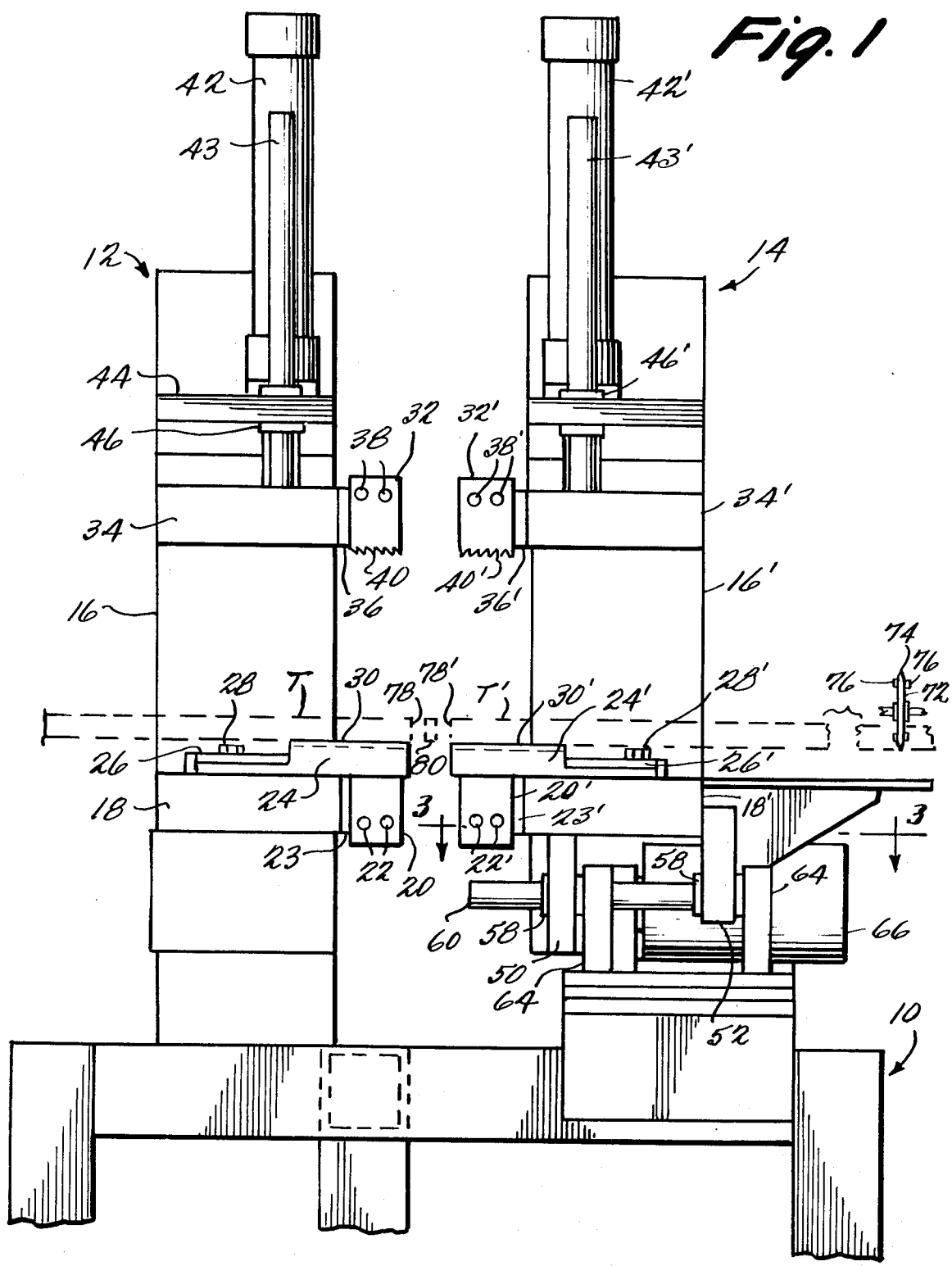
FIG. 1 is a front view of a splicing machine embodying the principles of the present invention.

The machine illustrated in FIG. 1 includes a rigid floor-supported main frame 10 on which is mounted two clamping assemblies 12 and 14 for clamping two strips of precured tire tread T and T'. The left hand assembly 12 as viewed in FIG. 1 includes a rigid frame 16 which is fixed at its lower end to the main frame 10. Secured to a piece 18 of the frame 16 is a stationary lower jaw 20 in the form of a block of metal having a flat upper surface coplanar with the upper surface of the frame piece 18. Electric resistance heating elements 22 are provided in holes drilled in the jaw, and a block 23 of thermal insulation is provided between the jaw and the frame piece 16. The heating may be accomplished by induction heaters using steam or electric heat, by radiation heaters of dielectric, or microwave energy, or by a combination of any heat source which will sufficiently heat the splice area enough to cure the uncured bonding material.

On top of jaw 20 and the frame piece 18 is a mold element 24 releasably secured in place by means of a holddown plate 26 which is bolted at 28 to the frame piece 18. The mold element 24 is a rigid plate having an upper surface 30 contoured complementary to the grooved surface of the respective tread strip T which is disposed in the machine with its grooved surface facing downwardly. The upper surface 30 of the mold element 24 thereby interlocks with the running surface of the tread strip and prevents relative movement between the strip and the mold element 24 in the plane of the latter.

A vertically movable upper jaw 32 is disposed above the lower jaw 20. The jaw 32 is secured to a jaw support member 34 with a block of thermal insulation 36 therebetween, and electric resistance heaters 38 are disposed in cavities in the jaw 32. The lower surface of the jaw 32 is serrated or otherwise provided with downwardly projecting tooth-like elements 40 for gripping the upper surface of the tread strip T.

Vertical movement of the upper jaw 32 is effected by a vertical hydraulic piston and cylinder unit 42 carried by a plate 44 which forms part of the frame 16. The lower end of the piston rod (not shown) of the unit 42 is connected to the jaw support member 34. Alignment and guiding of the latter is effected by two guide rods, one of which is shown at 43, which are secured at their lower ends to the member 34 and which slide in bearings 46 carried by the plate 44.

Figure 2:
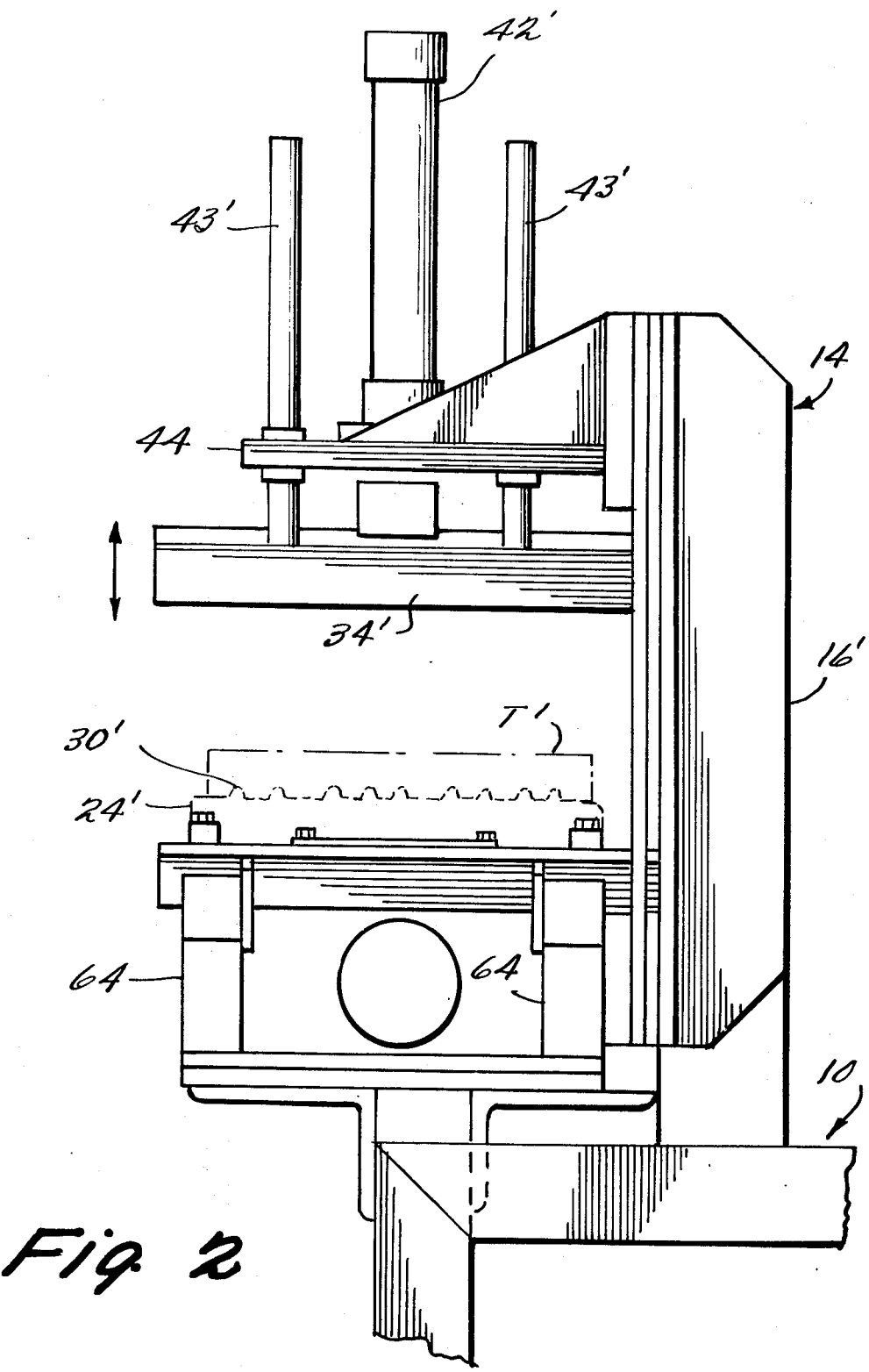
FIG. 2 is a side elevational view of the splicing machine of FIG. 1.
Figure 3:
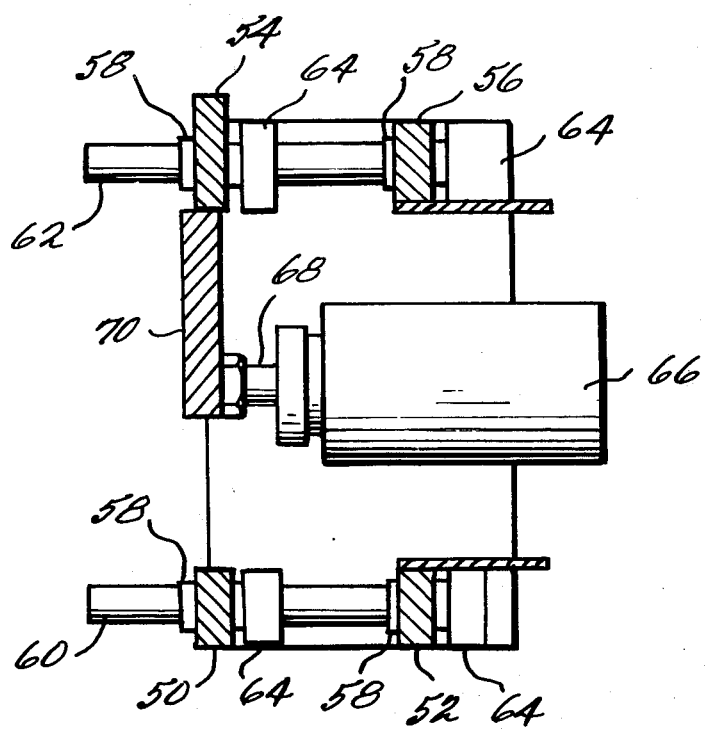
FIG. 3 is a sectional view taken on the line 3—3 of FIG. 1.

The clamping assembly 14 is similar to the clamping assembly 12 in that it includes lower and upper jaws 20' and 32' together with analogous elements 18° and 22' through 46' which need not be re-described. The assembly 14 is mounted on the main frame 10 for movement in a horizontal plane toward and away from the assembly 12. As shown in FIGS. 2 and 3 the assembly frame 16' includes four vertical post members 50, 52, 54 and 56 which are slidably mounted by means of bearings 58 on two spaced-apart parallel horizontal stationary shafts 60 and 62. The shafts 60 and 62 are fixed to the main frame 10 by means of mounting brackets 64. A horizontal hydraulic cylinder 66, shown in a retracted position, is fixed to the main frame 10, and the associated piston rod 68 is connected to the lower surface of the member 18' by means of a rigid plate 70.

The machine operates as follows. First, the operator prepares the tread strips T and T' by cutting off a small portion of each of two strips and 18'the ends which are to be joined. Simultaneous cutting and roughening can be accomplished with the aid of a circular rotary cutter 72 having a circumferentially continuous knife edge 74 and an annular bond 76 of abrasive on both sides adjacent the knife edge. Cutting is necessary to assure the presence of a straight flat edge and to ensure that each tread strip will engage with its respective mold element 24 or 24' in a proper longitudinal position. Roughening of the cut edges is necessary to assure a good bond during the splicing operation. The operator then places the prepared tread strips T and T' in the machine with the tread pattern of each strip closely fitted in its respective mold element 24 or 24'. The strips will have been cut at a preselected location so that they fit their molds in a manner such that the ends 78 and 78' to be spliced project a small but positive and preselected distance beyond their mold elements. Either at this time or previously the operator applies a vulcanizable bonding material 80 between the ends 78 of the strips.

The operator now actuates the hydraulic cylinders 42 and 42' to extend their piston rods and thereby lower the upper jaws 32 and 32' into tight clamping engagement with the upper surfaces of the tread strips T and T' respectively. The cylinder 66 is then actuated to extend the piston rod 68 thereby sliding the entire clamping assembly 14 along the stationary shafts 60 and 62 toward the stationary clamping assembly 12. This tightly presses the tread strip ends 78 and 78' into engagement with each other with the bonding material 80 therebetween. The clamping and pressing forces are maintained for a period of time sufficient to cause vulcanization of the bonding material 80 under the influence of the heat which is transmitted from the heating elements 22, 22', 38 and 38', through the intervening metal to the end portions of the tread strips T and T'. The bond integrally joins the edges 78 and 78'. When a large number of consecutive splices are to be made the heating elements will generally operate continuously. They may be thermostatically or manually controlled in accordance with the temperature of the respective jaws. When the bond has been effected the cylinders 42, 42' and 66 are retracted and the resulting single tread strip is removed from the machine.

What is claimed is:

1. Apparatus for splicing the ends of two precured rubber tread strips having tread grooves in one surface thereof, said apparatus comprising: two mold elements each of which has a ribbed surface complementary to the grooved surface of the tread strip whereby the ribs on the mold elements are insertable into grooves in tread strips, said mold elements being spaced apart and arranged with their ribbed surfaces generally in the same plane; a clamping element mounted adjacent each mold element so as to form an assembly for clamping the end portion of a tread strip between the respective mold element and clamping element, each clamping element having a clamping surface facing the respective ribbed surface; power means for effecting relative movement between the mold element and clamping element of each assembly toward and away from each other while maintaining the mold elements coplanar; power means for effecting relative movement between the assemblies toward and away from each other in the plane of the ribbed surfaces of the mold elements to thereby abut the ends of two tread strips clamped between the elements of the assemblies; and means for heating at least one element of each assembly in order to heat the end portions of the clamped tread strips when the latter are abutted with each other.

2. Apparatus as in claim 1 wherein said heating means are electrical resistance means.

3. Apparatus as in claim 1 wherein the surface of each clamping element facing the respective mold element is provided with a plurality of tooth-like projections for engaging the tread strip.

4. Apparatus as in claim 1 wherein each mold element is releasably secured to a support member and wherein each support member is provided with heating means.

5. Apparatus for splicing the ends of two precured rubber tread strips having tread grooves in one surface thereof, said apparatus comprising: first and second clamping assemblies mounted on a common support, each of said assemblies including two spaced-apart jaws, a ribbed mold element contoured complementary to the grooved surface of one of the tread strips whereby the ribs on the mold element are insertable into grooves in a tread strip, said mold element being releasably secured to one of the jaws, and means for moving at least one of said jaws toward and away from the other jaw; means inside at least one of the jaws of each assembly for heating the same; and means for moving at least one of the clamping assemblies relative to said common support and toward and away from the other clamping assembly so as to abut the ends of two tread strips clamped by the assemblies.

6. Apparatus as in claim 5 wherein each of the jaws to which a mold element is releasably secured is provided with heating means.

7. Apparatus for splicing the ends of two precured rubber tread strips having tread grooves in one surface thereof, said apparatus comprising: first and second clamping assemblies mounted on a common support, each of said assemblies including two spaced-apart jaws, a ribbed mold element contoured complementary to the grooved surface of one of the tread strips whereby the ribs on the mold element are insertable into grooves in a tread strip; means for moving at least one of said jaws of each assembly toward and away from the other jaw of that assembly, means for moving at least one of the clamping assemblies toward and away from the other clamping assembly so as to abut the ends of two tread strips clamped by the assemblies; and heating means for heating the end portions of tread strips clamped by the assemblies.

8. Apparatus as in claim 7 wherein each ribbed mold element is releasably secured to a support member which forms part of the respective jaw assembly.

* * * * *